Feb. 11, 1947.   C. L. RICHARDS   2,415,656
FREQUENCY MODULATED RECEIVER
Filed Nov. 18, 1944
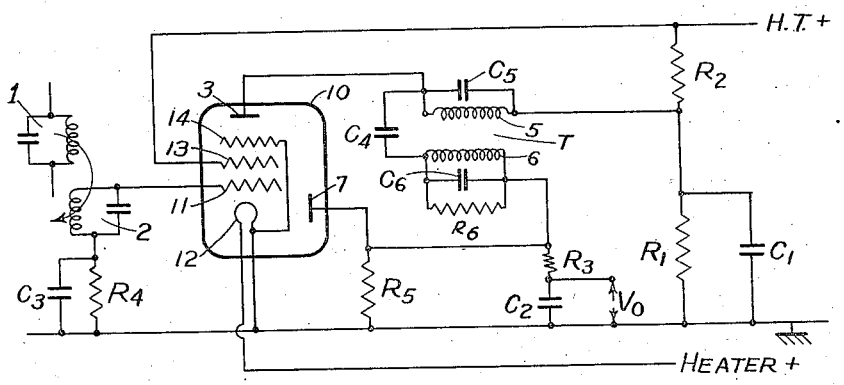
*Inventor:*
CLAUDE LANGDON RICHARDS
By
*Attorney*

Patented Feb. 11, 1947

2,415,656

UNITED STATES PATENT OFFICE 2,415,656

FREQUENCY MODULATED RECEIVER

Claude Langdon Richards, London, England, assignor to The Mullard Radio Valve Company Limited, London, England Application November 18, 1944, Serial No. 564,086
In Great Britain July 30, 1943

3 Claims. (Cl. 250—27)

The invention relates to frequency-modulated receivers and has for its object to provide an improved discriminator circuit for use in such receivers.

According to the present invention, in a frequency-modulated receiver the output from a limiter is applied to an inductance (primary) which is coupled with another inductance (secondary), the primary or the secondary or both forming part of a tuned circuit adjusted to the unmodulated carrier frequency, and a connection is provided between the limiter output circuit and the secondary circuit whereby a carrier frequency component from one circuit is added vectorially to a carrier frequency component from the other circuit, which components are 90° out of phase when the carrier frequency and the tuned circuit (or circuits) are exactly in tune, the relative phase angle varying on one or other side of 90° respectively as the carrier frequency is greater or smaller than the tuned frequency, the resultant of the components being applied to a rectifier circuit comprising a single diode. The rectifier circuit may be isolated from the primary by an interposed blocking condenser which preferably is disposed in the connection between the limiter output circuit and the secondary. The discriminator response curve has a straight portion on which it is desired to work. As the centre of the straight portion does not coincide with exact tuning to the unmodulated carrier frequency, the adjustment of the tuned circuit or circuits is preferably off tune to the extent necessary to give a working range on each side of the centre of the straight portion of the response curve.

The limiter is conveniently constituted by a pentode as in the preferred circuit arrangement embodying the invention illustrated in the accompanying drawing.

The tuned circuit 1 in the output of the preceding stage of the receiver is coupled with the tuned circuit 2 in the grid 11 of the pentode section of the pentode-diode tube 10. The pentode section of the tube 10 serves as a limiter for the incoming signal and such limiter action can be obtained in any of the customary manners. For example, the limiting may take place in the grid circuit or in the anode circuit or in the grid and the anode circuits of the limiter. In the example shown a combination of both methods is used and grid circuit limiting is produced by means of the condenser $C_3$ and resistance $R_4$, and anode circuit limiting is produced by a suitable choice of the circuit impedance and the anode voltage. The anode 3 of the pentode limiter is connected to the high tension positive by way of a potential divider constituted by the resistances $R_1$ and $R_2$ and the condenser $C_1$ the resistances $R_1$ and $R_2$ being so selected to bring about the anode limiting as above mentioned. The screen grid 13 of the pentode section is connected to the high tension positive whereas the suppressor grid 14 is connected to the cathode 12. In the output circuit of the anode 3 is an inductance 5 which in the arrangement shown has a condenser $C_5$ connected in parallel with it to constitute a tuned circuit. The inductance 5 constitutes the primary of a transformer T and is coupled with an inductance 6 constituting the secondary. Primary and secondary circuits are interconnected by way of a condenser $C_4$. The secondary circuit is also provided with a condenser $C_6$ to constitute a tuned circuit, and may, in addition, be provided with a damping resistance $R_6$. The resultant of the carrier frequency components from the primary and secondary circuits is applied to a diode rectifier, which may conveniently consist of an anode 7 cooperating with the cathode 12 of the pentode section of the tube 10, the pentode and the diode being accommodated within the same envelope. The diode is provided with a load resistance $R_5$. The output voltage is taken off at $V_0$, the condenser $C_2$ and the resistance $R_3$ constituting a filter for eliminating the carrier frequency.

From the above description it will be seen that an effective degree of discrimination is obtained in accordance with the invention from the combination of a limiter valve, through appropriate circuit elements providing at least one circuit tuned to the unmodulated carrier frequency, with one and only one diode rectifier, but it must be understood that the invention is not limited to the form described herein, since modifications may be introduced in the elements used and/or their relative arrangement, in order to provide the results indicated without departing in any way from the scope of the invention.

I claim:

1. A frequency modulated carrier wave detector comprising a limiter having an input circuit for the modulated carrier wave, a transformer having a primary winding connected in the output circuit of said limiter and a secondary winding, one of said windings being tuned to substantially the frequency of the unmodulated carrier wave and said secondary winding being magnetically coupled to said primary winding to produce a terminal voltage in quadrature with the output voltage of the limiter, means to interconnect one end of each of said windings to thereby combine said limiter output voltage and said terminal voltage to produce a resultant voltage, and means comprising a single diode for rectifying said resultant voltage.

2. A frequency modulated carrier wave detector comprising a limiter having an input circuit for the modulated carrier wave, a transformer having a primary winding in the output circuit of said limiter and a secondary winding, a capacitance in shunt with said primary winding and a capacitance in shunt with said secondary winding for tuning said windings to substantially the frequency of the unmodulated carrier wave, said secondary winding being magnetically coupled to said primary winding to produce a terminal voltage in quadrature with the output voltage of the limiter, a capacitance element interconnecting one end of each of said windings to thereby combine said limiter output voltage and said terminal voltage to produce a resultant voltage, and means comprising a single diode for rectifying said resultant voltage.

3. A frequency modulated carrier wave detector comprising a discharge tube having a cathode, an anode, a control grid interposed between the cathode and the anode, a screen grid interposed between the control grid and the anode and a diode anode, an input circuit for the modulated carrier wave connected between the control grid and the cathode, a resistance element and a condenser element connected in shunt with each other and in series with the control grid and cathode for producing grid circuit limiting of the carrier wave, means to operate the screen grid and said first anode at potentials to produce anode circuit limiting of the carrier wave, a transformer having a primary winding in the output circuit of said first anode and a secondary winding, a capacitance in shunt with said primary winding and a capacitance in shunt with said secondary winding for tuning said windings to substantially the frequency of the unmodulated carrier wave, said secondary winding being magnetically coupled to said primary winding to produce a terminal voltage in quadrature with the voltage across the primary winding, a capacitance element interconnecting one end of each of said windings to thereby combine said primary voltage and said terminal voltage to produce a resultant voltage, means to connect the other end of the secondary winding to said diode anode, and a load resistance element interconnecting the diode anode and the cathode, and an output circuit coupled to said diode anode for producing a voltage proportional to the modulation of said carrier wave.

CLAUDE LANGDON RICHARDS.

REFERENCES CITED

The following references are of record in the file of this patent:

UNITED STATES PATENTS

| Number | Name | Date |
|---|---|---|
| 2,259,891 | Hunt | Oct. 21, 1941 |
| 2,282,961 | Harris | May 12, 1942 |